C. N. COX.
TRAFFIC SIGNAL.
APPLICATION FILED JULY 18, 1917.
1,267,515.
Patented May 28, 1918.
4 SHEETS—SHEET 3.
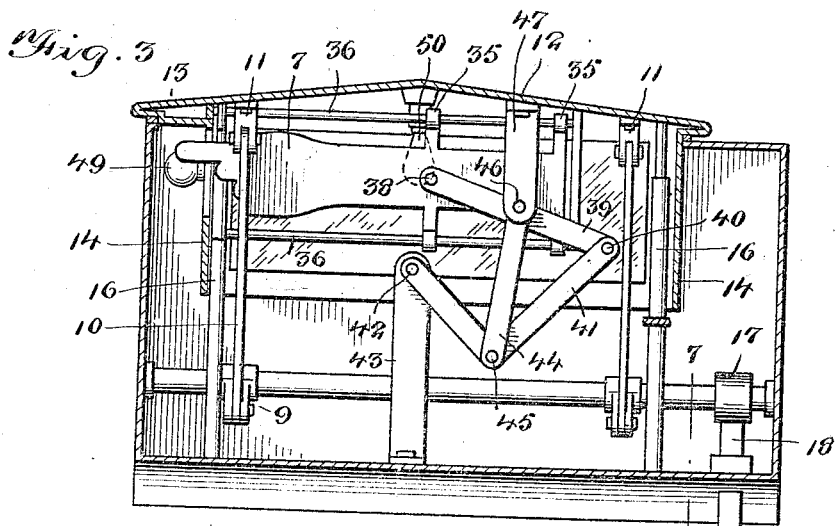
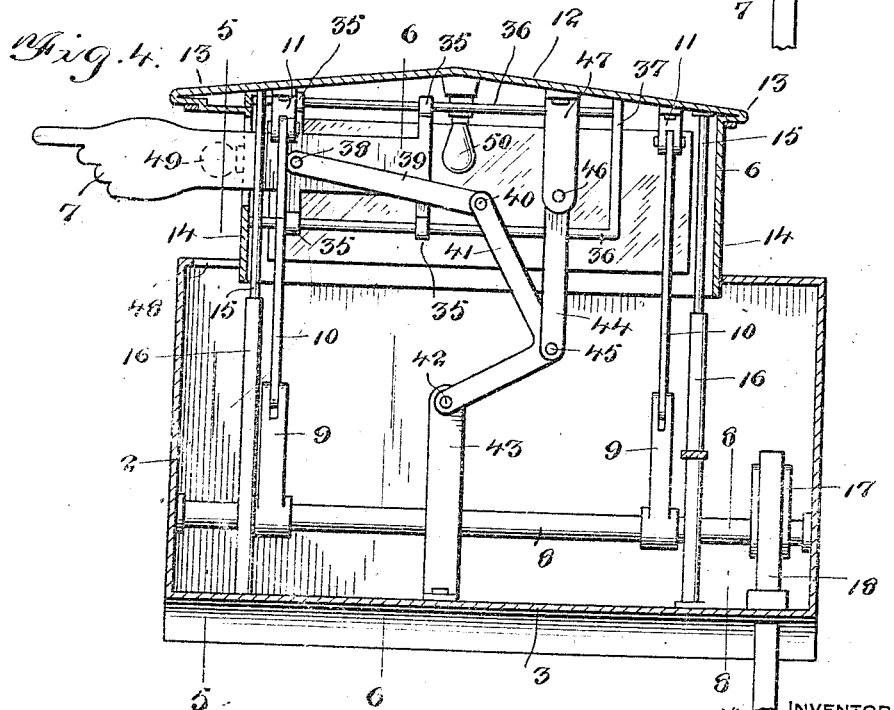
WITNESSES
INVENTOR
C. N. Cox
BY Victor J. Evans
ATTORNEY

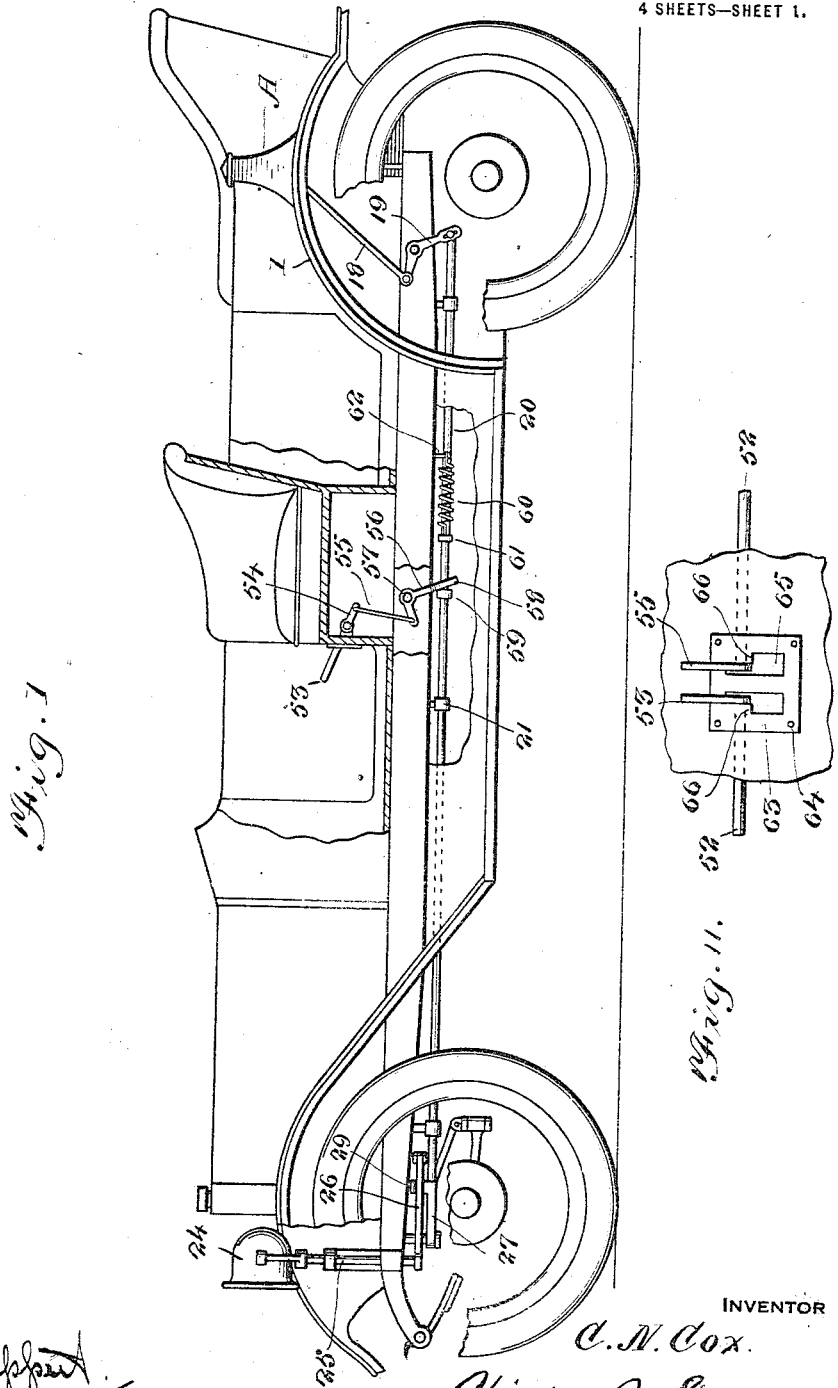

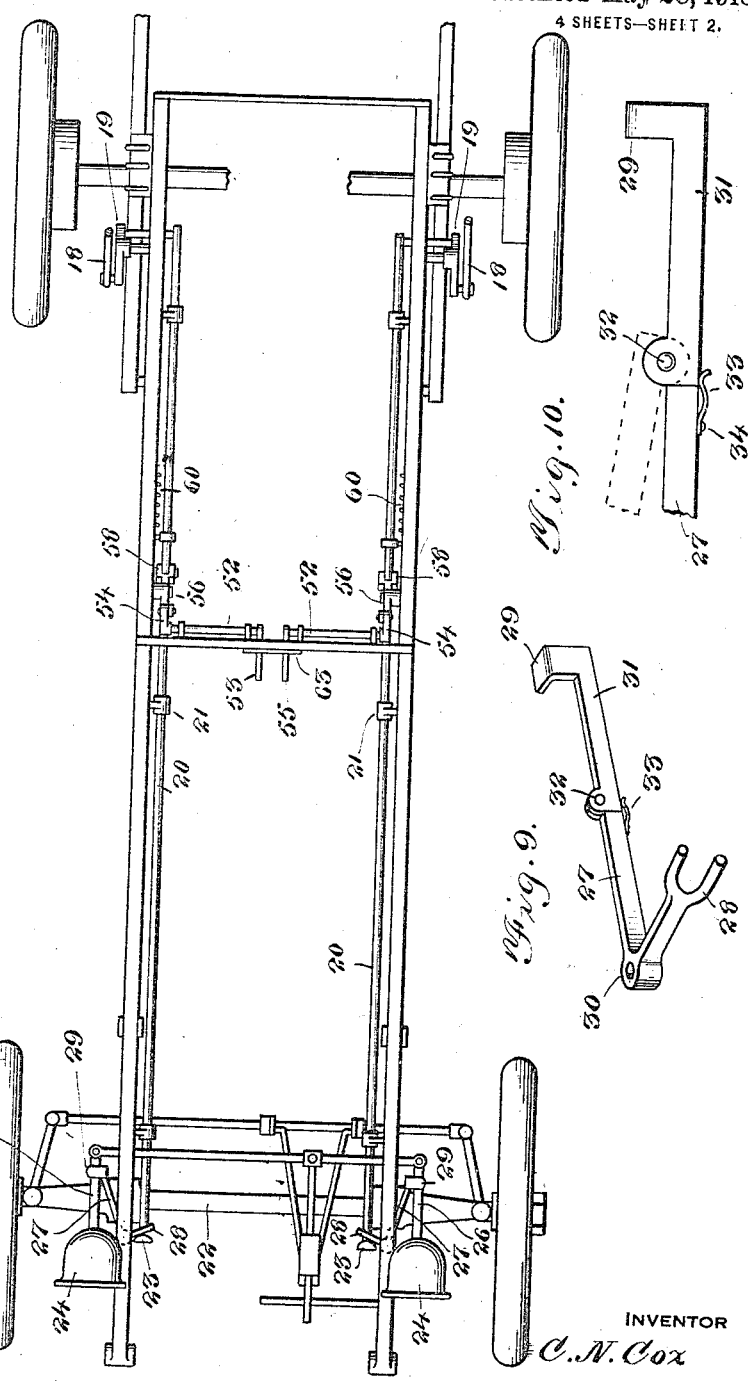

C. N. COX.
TRAFFIC SIGNAL.
APPLICATION FILED JULY 18, 1917.

1,267,515.

Patented May 28, 1918.
4 SHEETS—SHEET 4.

WITNESSES
E. R. Ruppert.
P. M. Smith.

INVENTOR
C. N. Cox.
BY Victor J. Evans
ATTORNEY

UNITED STATES PATENT OFFICE.

CHARLES N. COX, OF BROCKMAN, CALIFORNIA.

TRAFFIC-SIGNAL.

1,267,515.  Specification of Letters Patent.  Patented May 28, 1918.

Application filed July 18, 1917. Serial No. 181,372.

*To all whom it may concern:*

Be it known that I, CHARLES N. COX, a citizen of the United States, residing at Brockman, in the county of Lassen and State of California, have invented new and useful Improvements in Traffic-Signals, of which the following is a specification.

This invention relates to traffic signaling apparatus for motor vehicles, the broad object in view being to produce signaling apparatus which may be operated either automatically or manually, or both.

Primarily the signaling apparatus is designed to be used in conjunction with the lamp turning mechanism set forth in my Patent Number 1,216,216, granted Feb. 13, 1917, so that as the headlamps of a motor vehicle are turned to the right or to the left, the right or left hand signal is simultaneously shifted to its signaling position.

A further object of the invention is to provide means whereby the signaling members may be operated independently of the lamp turning mechanism, as for example during the day time, when the headlamps are not being used.

With the above and other objects in view, the invention consists in the novel construction, combination and arrangement of parts, herein described, illustrated and claimed.

In the accompanying drawings:—

Figure 1 is a side elevation partly in section showing the signaling apparatus in its applied relation to a motor vehicle.

Fig. 2 is a plan view of the chassis of the motor vehicle, illustrating the improved signaling apparatus.

Fig. 3 is a vertical longitudinal section through the housing of one of the signals, showing the signaling member housed.

Fig. 4 is a similar view showing the signaling member projected.

Fig. 9 is a detail perspective view of one of the bell crank levers which is associated with one of the lamp turning arms.

Fig. 10 is a fragmentary side elevation of the same.

Fig. 11 is a fragmentary elevation, showing the manually operable levers for operating the signaling members.

Figure 5:
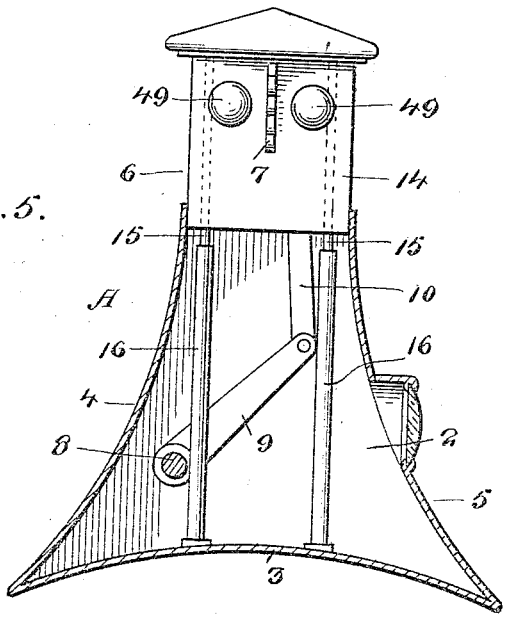
Fig. 5 is a vertical transverse section on the line 5—5 of Fig. 4.

Ordinarily two signals are employed, said signals being mounted upon and supported by the rear mud-guards 1, one of such signals being illustrated in Fig. 1 and mounted in the position just referred to. It is to be understood that a similar signal is mounted upon the mud-guard 1 at the opposite side of the vehicle.

Referring now to Figs. 3 to 8 inclusive, each signaling member designated generally at A comprises a main stationary casing 2 having an arcuate bottom wall 3 conforming in curvature to the mud-guard 1 and secured thereto by any suitable means. The casing 2 also comprises the reversely dished front and rear walls 4 and 5 which connect at their lower extremities to the bottom wall 3, thus providing the casing with a broad base where it is secured to the adjacent mud-guard 1.

In addition to the main stationary section 2 of the casing, the signal comprises a vertically movable casing section or housing 6 in which is slidingly mounted a pointer or indicator 7 movable in a substantially horizontal plane and normally concealed within the housing 6 and the casing 2 as shown in Fig. 3. The means for elevating and depressing the housing 6, consists of a rock shaft 8 having a pair of arms 9 fast thereon and connected by rods or links 10 to lugs or projections 11 on the under side of the top wall 12 of the housing 6, said top wall being reversely pitched or inclined to form a water shed and being extended sufficiently to form eaves 13 which project beyond the opposite walls 14 of said housing. Secured to the under side of the top wall 12 and extending downwardly therefrom are guide rods 15 slidable in tubular guides 16 located within the main stationary section 2 of the casing and secured to the bottom wall 3 thereof.

Figure 7:
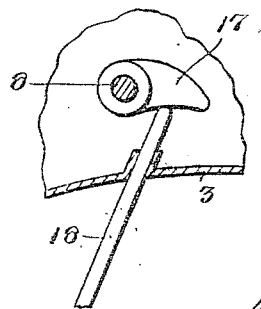
Fig. 7 is a fragmentary section on the line 7—7 of Fig. 3.
Figure 8:
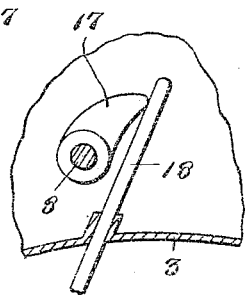
Fig. 8 is a fragmentary section on the line 8—8 of Fig. 4.

The shaft 8 of each signal has an operating arm 17, the form of which is best illustrated in Figs. 7 and 8, and said arm 17 is arranged to be operated by a plunger 18, which, as shown in Fig. 1 is pivotally connected to one arm of a bell crank lever 19 the other arm of which has a jointed connection with one of a pair of signal operating rods 20 extending longitudinally of the machine and movable through guides or hangers 21 attached to the frame of the vehicle. As shown in Fig. 2, each of the rods 20 extends to a point adjacent to or in advance of the front axle 22 of the vehicle where it is provided with a head 23. The head lamps 24 are mounted to turn on vertical axes, each of said lamps being mounted upon a vertical oscillatory post 25 having fastened thereto a lamp turning arm 26. Interposed between each lamp turning arm 26 and the adjacent signal operating rod 20 is a bell crank lever 27, one arm of which is formed with a fork 28 to straddle the adjacent rod 20 while the other arm is formed with a terminal laterally projecting lip 29 which overlies the adjacent lamp turning arm 26 as shown in Fig. 2. Each bell crank lever 27 is pivotally mounted at 30 so that as a left hand turn is being made, the arm 26 of the left hand lamp 24 in moving inwardly, will impart a corresponding movement to the bell crank lever 27, causing the fork 28 to coöperate with the head 23 of the rod 20 and move the same longitudinally in a forward direction. This, as shown in Fig. 1, rocks the bell crank lever 19 causing the latter to thrust the rod 18 upwardly and rearwardly thereby raising the arm 17 of the rockshaft 18 and causing the arms 9 and links 10 to raise the housing 6 in the manner hereinabove described. In the preferred embodiment of the bell crank lever 27, the latter embodies a hinged or pivoted section 31 connected to the main section 27 by a pivot or rule joint 32, the portions 27 and 31 of the bell crank lever being normally held in longitudinal alinement with each other by means of a leaf spring 33 having one end secured to the main section 27 of the lever by fastening means 34. The construction just referred to enables the hinged section 31 of each bell crank lever 27 to be thrown out of the path of movement of the adjacent lamp turning arm 26 so that the signals will not thereafter be operated by any part of the lamp turning mechanism.

The means for projecting and retracting the signaling members, pointers or indicators 7 will now be described. Each pointer 7 has a plurality of eyes or runners 35 which embrace and slide upon parallel and substantially horizontal guides 36 shown in the form of rods, the inner ends of which are connected to a bar 37 attached to the roof or top 12 of the housing 6 and the opposite extremities of which are attached fixedly to one of the end walls 14 of the housing 6. Connected by a pivot 38 to each pointer 7 is a link 39 connected at its opposite end by a pivot 40 to an elbow lever 41, the latter being connected by a pivot 42 to a post 43. Another link 44 is connected by a pivot 45 to the elbow of the lever 41 and is also connected by a pivot 46 to a hanger 47 fastened to and extending downwardly from the roof or top wall 12 of the housing 6. It will now be understood that as the housing 6 is elevated by the operating means hereinabove described, the link 44 pulls upwardly on the elbow lever 41 causing the link 39 to thrust the pointer 7 to its projecting or signaling position. As the housing 6 is depressed or returned to its housed position in the casing 2, the link 44 presses downwardly on the elbow lever 41 causing the link 39 to retract the pointer 7 until it is contained within the housing 6 before the latter is fully housed within the casing 2. A slot 48 in the top wall of the casing 2 provides the necessary clearance for such inward and downward movement of the pointer or indicator 7.

Figure 6:
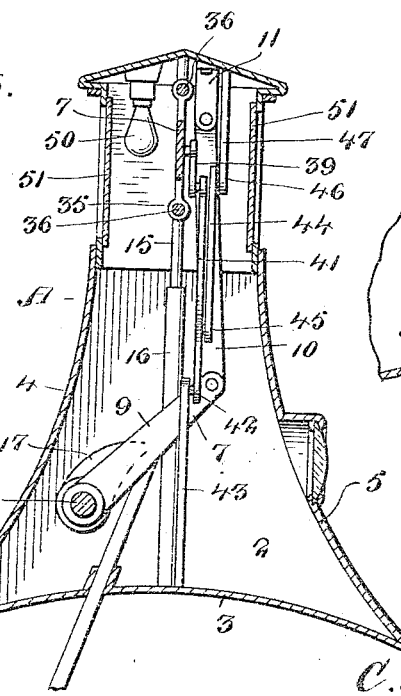
Fig. 6 is a similar section on the line 6—6 of Fig. 4.

When the signaling member 7 is in its projected or signaling position, it is illuminated at night time by lamps 49 arranged at opposite sides thereof and supported by the adjacent end wall 14 of the housing 6. Another lamp 50 is mounted within the housing section 6 and between transparent or translucent panels 51 arranged in the front and rear walls of the housing 6. The panels 51 may be of any desired color or may contain any desired signaling information and they are illuminated by the lamp 50 when the housing 6 is in its elevated position as shown in Figs. 4 and 6.

The means for manually operating the signaling members 7 is illustrated in Figs. 1, 2 and 11. Said operating means comprises a pair of rock shafts 52 which are shown as arranged in longitudinal alinement with each other and having at their inner adjacent ends hand levers 53. Each of said rock shafts 52 has at its outer end an arm 54 connected by a link 55 to one arm of a bell crank lever 56 pivotally mounted at 57 on the vehicle frame. The lever 56 has a fork 58 which embraces the adjacent signal operating rod 20 and coöperates with a stop or collar 59 on said rod, to press the latter in a forward direction which results in projecting the respective signaling member 7. Each rod 20 is normally held at the rear limit of its movement by means of a contractile spring 60 one end of which is connected to a collar or projectile 61 on said rod and the other extremity of which is connected to a fixed pin or lug 62 on the frame of the vehicle as shown in Fig. 1. 63 designates a keeper plate secured to the vehicle body by fastening means 64 and embodying slots 65 in which the hand levers 53 are movable. Each slot 65 is formed to provide an offset or shoulder 66 with which the adjacent lever 53 may be engaged to hold the respective signaling member 7 in its projecting or signaling position.

From the foregoing description taken in connection with the accompanying drawings, it will now be understood, that by means of the elbow levers 27, the signaling mechanism may be coupled to the lamp turning mechanism, as a result of which, when a head lamp is turned in one direction, the corresponding signaling member 7 at that side of the machine will be projected to its signaling position and simultaneously illuminated. By throwing the bell crank levers 27 out of their operative positions, the lamp turning mechanism will operate without affecting the signaling apparatus. The signaling apparatus may be operated manually by means of the levers 53 without interfering with the lamp turning mechanism and this is true irrespective of the positions of the bell crank levers 27 as the signal operating rods 20 are slidable through the forks 28 of said bell crank levers.

I claim:—

1. A traffic signal embodying, in combination, a stationary casing, a movable signaling member, a housing for said signaling member movable into and out of said casing, means for imparting movement to said housing, and means controlled by the movement of said housing for projecting and retracting said signaling member, said signaling member being movable in a plane substantially at a right angle to the path of movement of said housing.

2. A traffic signal embodying, in combination, a stationary casing, a movable signaling member, a housing for said signaling member movable into and out of said casing, means for imparting movement to said housing, and means controlled by the movement of said housing for projecting and retracting said signaling member, said signaling member being movable in a plane substantially at a right angle to the path of movement of said housing, the means for projecting and retracting the signaling member being controlled directly by the movement of the housing in which said signaling member is movable.

3. A traffic signal embodying, in combination, a stationary casing, a movable signaling member, a housing for said signaling member movable into and out of said casing, means for imparting movement to said housing, means controlled by the movement of said housing for projecting and retracting said signaling member, and guiding means for said signaling member contained within said housing and carried thereby.

4. A traffic signal comprising, in combination, a stationary casing, a signaling member, a housing for said signaling member movable in a substantially vertical plane through an opening in the top of the stationary casing, means connected with said housing for automatically projecting and retracting the signaling member as said housing is elevated and depressed, and means for elevating and depressing said housing controlled by an element of the steering mechanism.

5. A traffic signal embodying, in combination, a stationary casing, a movable signaling member, a housing for said signaling member movable into and out of said casing, means for imparting movement to said housing, means controlled by the movement of said housing for projecting and retracting said signaling member, the signaling member projecting and retracting means comprising an elbow lever having a fixed pivot, a link connecting said elbow lever with the signaling member, and another link connecting said elbow lever with a pivot having a fixed relation to the housing of said signaling member, whereby the movement of the signaling member is controlled by the movement of the housing of said signaling member.

In testimony whereof I affix my signature.

CHARLES N. COX.